United States Patent [19]

Patitsas et al.

[11] Patent Number: 5,580,513
[45] Date of Patent: Dec. 3, 1996

[54] TIRE CURING BLADDER WITH IMPROVED RELEASE CHARACTERISTICS

[75] Inventors: George P. Patitsas, Kent; Paul H. Sandstrom, Tallmadge, both of Ohio

[73] Assignee: The Goodyear Tire & Rubber Company, Akron, Ohio

[21] Appl. No.: 502,441

[22] Filed: Jul. 14, 1995

[51] Int. Cl.$^6$ ............ B29C 33/56; B29C 35/00; C08C 19/20

[52] U.S. Cl. ............ 264/501; 156/394.1; 264/315; 264/572; 425/27; 425/43; 425/52; 425/389; 425/502; 524/313

[58] Field of Search ............ 156/394.1, 130.5, 156/96, 110.1; 264/315, 314, 326, 337, 300, 572; 524/313; 428/35.4, 36.6, 36.8; 425/43, 27, 52, 28.1, 45, 389, 502

[56] References Cited

U.S. PATENT DOCUMENTS

| | | | |
|---|---|---|---|
| 2,382,529 | 6/1942 | Auer | 524/313 |
| 3,169,566 | 2/1965 | Ziarnik | 524/313 |
| 3,400,090 | 9/1968 | Maslow | 524/313 |
| 4,220,574 | 9/1980 | Perrone | 524/313 |
| 5,504,164 | 4/1996 | O'Donnell | 524/313 |

FOREIGN PATENT DOCUMENTS

0344021A2  11/1990  European Pat. Off. .

OTHER PUBLICATIONS

Organic Chemistry, second edition, by Seyhan N. Ege, published by D. C. Heath and Co. Lexington, Massachusetts Jan. 1, 1989, pp. 609–611.

Trade Literature from Exxon Chemical on Exxpro™ Elastomers, published by Exxon Chemical, Houston, Texas, Oct. 1, 1993, pp. 1–68.

Trade Literature published by Corn Refiners Association, Inc. Washington, D.C., Jan. 1, 1986, pp. 1–24.

Organic Chemistry, fourth edition, by Robert T. Morrison and Robert N. Boyd, published Jan. 1, 1983, by Allyn and Bacon Inc., Boston Massachusetts, pp. 1039–1047.

Food Fats and Oils by the Institute of Shortening and Edible Oils Inc., published Jan. 1, 1994, by the Institute of Shortening and Edible Oils, Washington, D.C., pp. i–29.

Rubber Technology, 2nd Edition, edited by Maurice Morton, published by Robert E. Kreiger Publishing Co., Malabar, Florida, Jan. 1, 1973, pp. 249–273.

American Standard Test Methods (ASTM) D412–92, published by American Standard Test Methods, Philadelphia, PA, Feb. 1, 1993, pp. 41–55.

Primary Examiner—Geoffrey L. Knable
Attorney, Agent, or Firm—Henry C. Young, Jr.; D. J. Hudak

[57] ABSTRACT

Disclosed are expandable bladders for use in curing presses for rubber compositions such as pneumatic tires. The bladders are a crosslinked elastomer comprising an isobutylene rubbery polymer. The bladder composition includes corn oil which improves the release characteristics of the cured bladder from a tire innerliner cured in contact with said bladder. The improved release characteristics have been observed to allow rubber compositions such as tires to be molded with fewer defects caused during release of the bladder from the tires or caused by abraded or deformed bladders. The use of corn oil also has been observed to increase the useful life time of the bladder allowing more tires to be cured without changing bladders. A preferred isobutylene rubbery polymer is a brominated copolymer of isobutylene and p-methylstyrene. The bladder compositions have also been observed to have an enhanced flexibility due to the corn oil.

20 Claims, No Drawings

1

TIRE CURING BLADDER WITH IMPROVED RELEASE CHARACTERISTICS

FIELD OF THE INVENTION

This invention relates to tire curing bladder having dispersed therein corn oil. The preferred rubbers of the bladder may include polymers of isobutylene such as butyl rubber, halogenated butyl rubbers, copolymers of para-alkylstyrene and isobutylene and/or halogenated copolymers of paraalkylstyrene and isobutylene. It also relates to a method of curing tires utilizing such a bladder.

BACKGROUND OF THE INVENTION

Conventionally, pneumatic rubber vehicle tires are produced by molding and curing a green (uncured) partially shaped tire in a molding press. The green tire is pressed outwardly against a mold surface (sometimes called a negative mold surface) by means of an inner fluid-expandable bladder. By this method the green tire is shaped against the outer mold surface which defines the tire tread pattern and configuration of the sidewalls. By application of heat and pressure the tire is molded and cured at elevated temperatures.

In general practice, the expansion of the bladder is accomplished by application of internal pressure to the inner bladder cavity which is provided by a fluid such as a gas, hot water and/or steam which also may participate in the transfer of heat for the curing or vulcanization of the tire. The tire after molding and curing is allowed to cool somewhat in the mold, sometimes aided by adding cold or cooler water supplied to the bladder. Then the mold is opened, the bladder is collapsed, including release of its internal fluid pressure, and the tire is removed from the tire mold. Such use of tire curing bladders is well known to those having skill in the art.

It is recognized that there is relative movement between the outer contacting surface of the bladder and the inner surface of the uncured tire during the expansion phase of the bladder. Likewise, there is relative movement between the outer contacting surface of the bladder and the cured inner surface of tire during the collapse of the bladder and the stripping from the cured tire after the tire has been molded and cured (vulcanized).

The bladder surface can tend to stick to a inner surface of the cured tire during the bladder collapsing part of the tire cure cycle. This adhesion may cause roughening of the bladder surface or of the inner surface of the tire. This reduces bladder durability and can produce defective tires. For this reason, it is conventional practice to precoat the inner surface of the uncured tires or the outer surface of the bladder with a lubricant in order to enhance lubricity between the outer bladder surface and inner tire surfaces during the entire molding operation. This lubricant has also been called a bladder lubricant, and is often a silicone polymer dispersed in a solvent or water.

It is to be appreciated that the release of the cured tire from its cure bladder in an industrial manufacturing setting is intimately associated with both the phenomenon of release (to prevent sticking or adhesion) and the phenomenon of lubrication (to enhance slipping) between the bladder and the adjacent tire surfaces.

Butyl rubber is commonly used in tire curing bladders. Butyl rubber is a copolymer of predominantly isobutylene with small amounts of diene monomers, usually isoprene, to give sufficient unsaturation to allow the butyl rubber to be crosslinked. Copolymers of isobutylene and paramethylstyrene which are subsequently brominated are being manufactured by the Exxon Chemical Company. These polymers are useful in many applications where butyl rubber is used. Oils such as castor oil, napthenic and other aromatic oils have been used in curing bladders to plasticize (make more easily deformable) the composition and to produce cured articles by the use thereof in a molding operation.

Accordingly, it is desired to provide curing bladders with decreased adhesion to cured tires.

SUMMARY OF THE INVENTION

This invention relates to a curing press of the type which uses an expandable bladder to assist in shaping and curing rubber compositions. The incorporation of corn oil (comprising primarily triglycerides) into curing bladders from copolymers from isobutylene and alkylstyrene was found to significantly lower adhesion of the innerliners of cured tire to said curing bladders. Corn oil is characterized generally as esters of glycerol and long-chain specific carboxylic acids also known as triglycerides.

Isobutylene polymers which are generally at least 50 weight percent of the total rubbery polymers of said curing bladders have at least 80 weight percent of their repeat units from isobutylene. They may be copolymers of isobutylene and p-methylstyrene, or halogenated (preferably brominated) versions thereof which are believed to have enhanced heat stability, or they may be butyl or halogenated butyl rubber (copolymers of isobutylene and a conjugated diene). The experimental data indicates at least 10 weight percent of the isobutylene polymers need to be copolymers of isobutylene and para-alkylstyrene.

The triglycerides in corn oil were found to be more effective than those in castor oil in decreasing the stiffness of the uncured formulations. The decrease in stiffness facilitates placing the uncured formulations in the molding equipment for making the bladders.

DETAILED DESCRIPTION

The corn oil desirably incorporated into the curing bladders are triglycerides of a particular type. Such naturally occurring triglycerides are esters of glycerol (1,2,3-propanetriol) and long-chain carboxylic acids. The carboxylic acids may be saturated, or unsaturated and desirably have from 0 to 3 carbon-carbon double bonds and predominantly are carboxylic acids with from 12 to 24 carbon atoms. A majority of said carboxylic acid (desirably above 60 mole percent, more desirably above 65 mole percent) have 18 carbon atoms. The desirable corn oil triglycerides are derived from carboxylic acids which are desirably essentially free of hydroxylated carboxylic acids (i.e. less than 20 mole percent, more desirably less than 10 percent, and preferably less than 1 mole percent). A commercial source of effective triglyceride is corn oil. Soybean oil and castor oil appear not to contribute to improved release characteristics and may be excluded from this consideration herein.

Corn oil refers to an oil recovered from the kernels of corn, Zea mays. The corn oil may be extracted from the corn kernels, for example, by a mechanical pressing of the oil containing portions of the kernels or by a solvent (e.g. hexane) extraction of the oil or any other practical means. It is known that the corn germ contains about 85 percent of the total oil of the kernel. The rest is dispersed in the endosperm and hull. The clean, dried germ obtained from wet milling dent corn has from about 45 to about 55 weight percent oil.

Mechanical expelling and solvent extraction can extract 95 weight percent of the oil from the germ.

The corn oil may be refined or further processed after extraction by a variety of processes. Refining may include degumming to remove phosphatides; alkali treatment to neutralize free fatty acids; bleaching for trace element removal; winterization (the removal of high-melting waxes); and deodorization (steam stripping under vacuum). These processes for corn oil are well known. Removal of phosphatides generally uses hot water, alkali treatment generally uses a concentrated sodium hydroxide to remove free fatty acids, bleaching generally uses acid activated clays, and winterization removes crystallized waxes after chilling. A typical refined corn oil retains from about 98 to 99.9 weight percent triglycerides, about 0.01 to 0.3 weight percent free fatty acids, about 0.3 to 2 weight percent phytosterols (asteroid type alcohol), and from 0.02 to 0.2 weight percent tocopherols (a constituent of vitamin E). Tocopherols help retard the development of rancidity and are desirably retained during refinement.

The corn oil may be hydrogenated (partly or fully) and still meet the broadest limitations of this application for triglycerides since the carboxylic acid can have from 0 to 3 unsaturated carbon-carbon double bonds. Desirably the corn oil is not vulcanized before being added to the bladder composition. Preferably the carboxylic acids of said triglycerides comprise from about 8 to about 12 weight percent palmitic acid, from about 1.5 to about 4.5 weight percent stearic acid, from about 19 to about 45 weight percent oleic acid, from about 35 to about 62 weight percent linoleic acid, and from about 1.3 to about 2.3 weight percent linolenic acid. Mixtures of corn oil and hydrogenated corn oil may be used.

The corn oil is added during mixing of the bladder formulation and is, therefore, dispersed throughout the composition and the molded bladder.

The triglycerides of corn oil vary from castor oil (which is in a control formulation) in that castor oil triglycerides are characterized as esters from carboxylic acids comprising 87–90 weight percent ricinoleic acid, (cis-12-hydroxyoctadec-9-enoic acid, $CH_3$—$(CH_2)_5$—$CH(OH)CH_2$—$CH=CH$—$(CH_2)_7COOH$). Ricinoleic acid is a hydroxylated carboxylic acid. Castor oil has been observed to not impart as much softening to uncured bladder compositions as does corn oil nor has castor oil been observed to impart the release characteristics found with corn oil.

The corn oil is desirably used in amounts from about 1 to about 20 phr, more desirably from about 2 or 3 to about 18 phr, and preferably from about 5 to about 15 phr.

The term "phr" refers to parts by weight per one hundred parts by weight total rubber in a rubber composition. The term phr is a standard term used by most rubber formulators as it facilitates formulation changes and comparisons when all ingredients are measured in relation to one hundred parts by weight of the rubber rather than the total formulation weight. Rubbers or rubbery polymers are crosslinkable, predominantly noncrystalline polymers with Tg values of the predominant components on a weight basis being below 0° C. and preferably below −20° C.

Desirably the rubbery polymers are at least 50 weight percent, more desirably at least 75 or 80 weight percent and preferably at least 90 or 95 of at least one isobutylene rubbery polymer having at least 50 weight percent repeat units from isobutylene. Desirably at least 70 and preferably at least 80, 85 or 90 weight percent of the repeat units thereof are derived from isobutylene. Polymer is used to mean homopolymers and copolymers. Copolymer is used herein to mean a polymer from 2 or more monomers. Desirably at least 10 weight percent, more desirably at least 20 weight percent and preferably at least 50 weight percent of the isobutylene rubbery polymers or alternatively of said rubbery polymers is a copolymer of isobutylene and para-alkylstyrene (described below) so that the corn oil favorably affects the bladder release properties.

A rubbery polymer for this application is a copolymer comprising repeat units from an isoolefin and para-alkylstyrene. This copolymer is desirably post-brominated as recited below. The iso-olefins may have from 4 to 7 carbon atoms (e.g. isobutylene). If the iso-olefin is isobutylene (which is preferred) the copolymer is an isobutylene rubber polymer. The alkyl of para-alkylstyrene may have from 1 to 11 carbon atoms. Desirably, at least 50 weight percent, more desirably at least 75, 80, 85 or 95 weight percent of the rubbery polymers of the bladder formulation are one or more polymers having repeat units from at least an isobutylene and a para-alkylstyrene. Desirably, the para-alkylstyrene is at least 80, 90, or 95 weight percent or more para-methylstyrene. Desirably the copolymer is from 1 to 20 weight percent paramethylstyrene, and more desirably from 2 to 15 weight percent para-methylstyrene. Desirably the copolymer is from 80 to 99 weight percent isobutylene and more desirably from 85 to 98 weight percent.

Desirably the above copolymer is a halogenated (e.g. brominated) copolymer with a halogen (e.g. bromine) content up to 5 weight percent and preferably from about 0.2 to about 1.5 or about 2.5 weight percent in the copolymer. Halogenation with other halogens (e.g. chlorine) is less preferred. Conjugated diene monomers having 4 to 8 carbon atoms may optionally be present in amounts up to 5 or 8 weight percent, and more desirably from 0.5 to 3 weight percent of the copolymer. The preferred copolymer of isobutylene and para-methylstyrene is essentially free of isoprene and other conjugated dienes (i.e. less than 1 percent or less than 0.2 percent by weight of the polymer).

A preferred copolymer is brominated butyl rubber called Exxpro™ with a Mooney Viscosity ML (1+8) 125° C. of 50±10, an isobutylene content of about 94 or 95 weight percent, and a para-methylstyrene content of about 5 weight percent, with a total bromine content of about 0.8 weight percent. A European Patent Application having Publication No. 0,344,021 describes how to make the above polymers and is hereby incorporated by reference. Exxpro™ polymers are available from Exxon Chemical Company. Optionally, other butyl rubbers or other general purpose diene based elastomers may be used in combination with the isobutylene and para-methylstyrene copolymers or in lieu thereof.

Another useful isobutylene rubbery polymer is a copolymer from isobutylene and one or more conjugated dienes, preferably isoprene. Desirably, the conjugated diene (e.g. isoprene) is present from 1 to 5 weight percent and the remainder (e.g. from 95 to 99 weight percent) is isobutylene and optionally a halogen. These copolymers from isobutylene and conjugated dienes may include butyl rubber and halogen substituted butyl rubbers such as chlorobutyl and bromobutyl rubbers.

Small amounts (e.g. less than 10 or 20 weight percent of all rubbery polymers) of general purpose diene based elastomers such as neoprene rubber may be included as cure accelerators or for other purposes. Neoprene rubber (also known as poly(chloroprene)) is often added as a common co-curative in resin cure systems as described below. In rubber formulations the neoprene is counted towards the 100 parts by weight rubber even though it has a separate function as a halogen containing elastomer. If a halogenated isobutylene polymer is present there may be no need for an additional halogen source.

The butyl rubber bladder can be cured with sulfur cure or resin cure systems. Cure systems without resin curing agents are less preferred with isobutylene polymers having residual unsaturation. Representative resins for curing include conventional phenolic resins which are used in an amount from about 1 to about 10 or about 15 phr. A resorcinol or phenol-formaldehyde resin cure system is often used for such purposes. Several examples herein use combinations of phenol-formaldehyde, sulfur and sulfur accelerators as curatives. Such cure systems for bladder compositions are well known to those having skill in the art. For an example, see U.S. Pat. No. 3,031,423 which is hereby fully incorporated by reference. A resin cure system using phenol-formaldehyde, along with a small amount of sulfur is shown in Table I. Reactive phenol-formaldehyde resins for curing butyl rubbers are commercially available and well known to the art.

The cured rubber composition of the curing bladder may also contain conventional additives including fillers, peptizing agents, stearic acid, accelerators, sulfur vulcanizing agents, reactive resins for curing, antiozonants, antioxidants, processing oils, activators, initiators, plasticizers, waxes, prevulcanization inhibitors, extender oils, and the like.

If a sulfur cure system is to be used, the amount of sulfur may desirably be from about 0.1 to 5, more usually from about 0.5 to about 2, (phr) parts by weight per 100 parts rubber. Representative of sulfur vulcanizing agents include sulfur; sulfur donating agents, for example amine disulfide, polymeric polysulfide, or sulfur olefin adducts.

Accelerators for sulfur cured systems may be used in amounts from 0.1 to 5 phr and more desirably from 0.5 to 2.5 phr. These types of accelerators are well known and include amines (e.g. hexanethylene tetramine), disulfides, guanidines, thioureas, thiols, thiazoles, thiurams, sulfenamides, dithiocarbamates and xanthates. As classes, many of these accelerators are either too fast or too slow for curing bladder systems but they may be used in small amounts or specific compounds in each group may be appropriate for use in curing bladders. Blends of two or more accelerators may also be used. Scorch inhibitors may be used to extend the mixing time before curing starts. The inhibitors are commercially available and have little effect on the final properties of bladder.

Fillers include reinforcing fillers such as carbon black which may be used in amounts from about 10 or 25 to about 75 or about 85 phr or even 100 phr. Typical carbon blacks that may be used include, for example, acetylene blacks, N110, N121, N220, N231, N234, N242, N293, N299, N326, N330, M332, N339, N343, N347, N351, N358, N375, N472, N539, N550, N660, N683, N754, and N765. Reinforcing type fillers (such as carbon black) are preferred for use in curing bladders. Silica may be used in addition to carbon black.

Antioxidants and antiozonants may desirably be added to the curing bladder composition. Antioxidants prevent oxidative crosslinking or oxidative chain scission so that the modulus and fracture properties of the rubber are unchanged during exposure to oxidation especially at elevated temperatures. Antioxidants for rubber compounds in general and for butyl rubber more specifically are well known to the art. Desirable amounts are from 0.1 to 10 phr and more desirably from about 2 to 6 phr. Antiozonants are compounds that prevent chain scission due to exposure to ozone. They are also well known to the art. Antioxidants and antiozonants include monophenols, bisphenols, thiophenols, polyphenols, hydroquinone derivatives, phosphites, phosphate blends, thioesters, naphthylamines, diphenolamines, as well as other diaryl amine derivatives, para-phenylene diamines, quinolines and blended amines.

Various additional oils and waxes may be used in a curing bladder formulation in addition to the specified triglycerides from corn oil. Depending upon the compatibility of the oils and waxes with the butyl rubber and the other components of the rubber formulation, they may be uniformly dispersed or they may purposefully tend to phase separate from the composition (migrate to the surface). Waxes include microcrystalline wax and paraffin wax. Oils include aliphatic, napthenic and aromatic resins, polyethylene glycol, petroleum oils, ester plasticizers, vulcanized vegetable oils, castor oil, pine tar, phenolic resins, petroleum resins, polymeric esters, and rosins. Desirably these oils and waxes are substantially or completely replaced with the corn oil of this disclosure. Oils and waxes other than corn oil can be used in amounts up to 20 phr and more desirably from 1 to 10 phr. They are usually considered plasticizers and modulus modifiers. Fatty acids such as stearic acid, palmitic acid and oleic acid may be used in amounts from about 0.1 to 5 phr, with a range of from about 0.2 to 1 phr being preferred. Zinc oxide may be present in amounts from about 0.5 phr to about 10 phr.

A procedure for mixing and molding curing bladders in general and for the examples is given below. In a Banbury mixer or the equivalent (e.g. high shear mixer such as a two roll mill) the rubbery polymers, a substantial portion of the carbon black, the oils, stearic acid and zinc oxide were mixed until the mix temperature reached about 165° C. The material was dumped onto a sheet-off mill and cooled. The cooled material was added to a Banbury mixer or equivalent in the second mixing stage. Then the residual carbon black and processing aids were added during mixing until the Banbury mix temperature reached about 150° C. The material was again dumped onto a sheet-off mill and cooled. In the third and fourth mixing stages the curatives (including any phenolic resin, accelerators, and sulfur) were added and mixed until the mix temperature reached about 115° C. The material was dumped and cooled subsequent to the third and fourth stages.

The curing bladder may be molded in an injection molding machine, transfer molding machine or compression molding. The material from the Banbury may be extruded as a slug. The use of the corn oil (triglycerides) of this disclosure make the composition before molding more pliable facilitating placing it in the mold. A Monsanto rheometer is used to determine the approximate time to develop optimal cure at specific temperatures. The actual cure time will depend on heating rate and the gauge (thickness) of the curing bladder. The curing bladder desirably will have a toroidal shape. The curing bladder material tested in the examples was cured for 60 minutes at 171° C.

The curing bladders of this invention are useful for molding and curing various hydrocarbon rubber compositions including pneumatic vehicle tires and miscellaneous pneumatic tires for other applications. Other rubbery articles which can be cured in bladder equipped curing presses include, for example, hoses, various sleeves, and air springs (a shock absorbing spring used in heavy commercial vehicles). The curing bladders have good lubricity, desirable release characteristics from cured hydrocarbon rubbers, and extended use lifetimes due to their enhanced release characteristics.

Typical properties of a curing bladder as produced are desirably a 300 percent Modulus of 4.0 to 8.0 MPa, a Breaking Strength of 5 to 14 MPa, an Elongation at Break of 400 to 1,000 percent, a Shore A Hardness at 100° C. of 35 to 65, a Hot Tension Set ASTM D412 16 hours at 50 percent elongation and 190° C. of 5 to 25 percent, and a Hot Peel Adhesion to a butyl rubber innerliner of 40 to 100N. More desirably the curing bladder has a 300 percent Modulus of 4 to 6 MPa, a Breaking Strength of 8 to 11 MPa, an Elongation at Break of 600 to 800 percent, a Shore A Hardness of 40 to 50, a Hot Tension Set of 8 to 22 percent, and a Hot Peel Adhesion of 45 to 90N. The properties of a curing bladder after aging 24 hours at 191° C. desirably include an Elongation at Break of 250 to 600 percent, more desirably 275 to 500 percent, a 200 percent Modulus of 4.0 to 7.5 MPa, a Breaking Strength of 4.5 to 7.5 MPa, a Shore A Hardness at 100° C. of 55 to 75 and a Hot Tension Set of 13.0 to 22.0 percent.

The following Table I shows a compounding recipe for a Control I and Example I which are curing bladder compositions. Table II shows the effect of corn oil on the curing rate and physical properties of the bladder. The isobutylene rubbery polymer in Control I and Example I is a copolymer of isobutylene and paramethylstyrene which has been brominated.

TABLE I

| | Control I (parts by weight) | Example 1 (parts by weight) |
|---|---|---|
| 1st Stage | | |
| Exxpro ™ Butyl[1] | 100.00 | 100.00 |
| Carbon Black | 31.00 | 31.00 |
| Castor Oil[2] | 6.00 | |
| Alkylated Napthenic & Aromatic Hydrocarbon Oils | 4.00 | |
| Corn Oil[3] | | 10.00 |
| Stearic Acid | 0.5 | 0.5 |
| 2nd Stage | | |
| Carbon Black | 24.00 | 24.00 |
| Processing Aid | 5.00 | 5.00 |
| 3rd Stage | | |
| Curatives[4] | 2.85 | 2.85 |
| 4th Stage | | |
| Curatives[4] | 12.00 | 12.00 |
| Total: | 185.35 | 185.35 |

1. Exxpro ™ butyl is a copolymer of isobutylene and para-methylstyrene which is about 94 weight percent isobutylene and about 5 weight percent para-methyl styrene and about 1 weight percent bromine which is primarily present on the para-methyl group as a result of bromination. The material has a Mooney viscosity ML (1 + 8) 125° C. of 50 ± 10. It is available from Exxon Chemical Company.
2. Castor oil obtained as Number One from the CasChem, Inc. company.
3. Liquid corn oil from the Archer Daniels Midland Company.
4. The curatives comprise a phenolic resin curative, sulfur, retarders and accelerators for sulfur cure in conventional amounts.

TABLE II

| Physical Properties | | |
|---|---|---|
| | Control I | Example I |
| Uncured | | |
| $T_{25}$, min. at 170° C. | 7.35 | 6.0 |
| $T_{90}$, min. at 170° C. | 15 | 9.5 |

TABLE II-continued

| Physical Properties | | |
|---|---|---|
| | Control I | Example I |
| Green Strength, MPa @ 240% Elongation | 0.413 | 0.270 |
| (Standard Deviation) | (0.015) | (0.0) |
| Molded Specimen | | |
| 300% Modulus, MPa | 4.92 | 4.78 |
| % Elongation at Break | 688 | 675 |
| Hot Peel Adhesion to Halobutyl Innerliner (Newtons) (No Lubricant) | 102 | 80 |
| Glass Transition Temperature | −64° C. | −68° C. |
| Breaking Strength Mpa | 9.00 | 9.00 |
| Shore A Hardness @ 100° C. | 47.7 | 44.7 |
| Hot Tension Set 16 hrs @ 190° C. and 50% Elongation (%) | 11 | 10 |

Table II shows the difference in a curing rate and physical properties between a control bladder composition and an Example I composition resulting from substituting 10.0 phr of corn for a blend of 6.0 phr castor oil and 4.0 phr alkylated napthenic and aromatic hydrocarbon oil. Brominated isobutylene and para-methylstyrene was the rubbery polymer used in both Example I and the control. Reactive phenol-formaldehyde curatives were used along with sulfur type curatives. The brominated isobutylene and paramethylstyrene may serve as a halogen source for phenolic resin curing. There was a slight increase in the cure rate from the corn oil substitution. The 300 percent modulus was slightly lower in Example I than in Control I. The Hot Peel Adhesion to a halobutyl rubber innerliner was measurably lower (20 percent=22/102) in Example I as compared to Control I. This will result in bladders that need less frequent applications of mold lubricant or have increased useful lives.

The decrease in green strength at 240° percent elongation is a modulus type value and indicates the uncured composition with corn oil is more easily deformed in tension. The property of decreased modulus of uncured compositions allows the bladder composition in extruded form to bend and deform facilitating its introduction into a press where it is shaped and cured into bladder.

The following Tables III and IV show Control II and Examples II and III where 6 or 10 parts of corn oil were substituted for 6 parts of castor oil. The isobutylene polymer is a brominated copolymer of isobutylene and para-methylstyrene. Note the releasing aid was eliminated in Example III. Table IV shows the effect of corn oil on the physical properties (including peel adhesion) of the bladder.

TABLE III

| | Control II (parts by weight) | Example II (parts by weight) | Example III (parts by weight) |
|---|---|---|---|
| Exxpro ™ Butyl[1] | 100.00 | 100.00 | 100.00 |
| Carbon Black | 55.00 | 55.00 | 55.00 |
| Castor Oil[2] | 6.00 | | |
| Corn Oil[3] | | 6.00 | 10.00 |
| Alkylated Napthenic & Aromatic Hydrocarbon Oils | 4.00 | 4.00 | 0 |
| Stearic Acid | 0.50 | 0.50 | 0.50 |
| Curatives[4] | 13.20 | 13.20 | 13.20 |
| Sulfur[4] | 0.75 | 0.75 | 0.75 |
| Cure Retarder[4] | 0.90 | 0.90 | 0.90 |
| Green Strength, MPa | 0.413 | 0.362 | 0.270 |

TABLE III-continued

|  | Control II (parts by weight) | Example II (parts by weight) | Example III (parts by weight) |
|---|---|---|---|
| at 240% Elongation (Standard Deviation) | (0.015) | (0.003) | (0) |

1. Same specifications as Exxpro ™ Butyl in Table I.
2. Same specifications as in Table I.
3. Same specifications as in Table I.
4. Same as in Table I.

TABLE IV

|  | Control II | Example II | Example III |
|---|---|---|---|
| Physical Properties of Molded Specimen Table IV Laboratory Batch before Aging | | | |
| Break Strength, MPa | 8.99 | 8.99 | 9.12 |
| Elongation at Break, % | 688 | 677 | 675 |
| Shore A Hardness at 100° C. | 47.7 | 46.0 | 44.7 |
| Hot Tension Set %, 16 hrs 190° C. 50% | 11.0 | 13.0 | 10.0 |
| 95° C. Peel Adhesion to Halobutyl Innerliner (Newtons) (No lubricant) | 102.0 | 88.0 | 80.0 |
| Glass Transition Temperature | −61° C. | −66° C. | −67° C. |
| Physical Properties After 24 Hours @ 191° C. Laboratory Sized Batch | | | |
| Break Strength, MPa | 5.26 | 4.88 | 4.99 |
| Elongation at Break, % | 309 | 295 | 286 |
| Shore A Hardness at 100° C. | 64.1 | 63.2 | 62.7 |
| Hot Tension Set, %, 16 hrs 190° C. 50% Elongation | 19 | 18 | 15 |
| Physical Properties of Molded Specimen before Aging Production Sized Mixed Batch | | | |
| Hot Peel Adhesion to Halobutyl Innerliner (Newtons) (No Lubricant) | 94.0 |  | 44.0 |
| 200% Modulus MPa | 4.24 | 4.13 | 4.15 |

In Table III and IV above, Example II shows the substitution of 6 parts by weight of corn oil for 6 parts by weight of castor oil. Example III shows the substitution of 10 parts by weight of corn oil for 6 parts of castor oil and 4 parts of releasing aids. As in the previous Example I the use of corn oil resulted in a lower modulus for the Green Strength Test at 240° percent elongation. Although the hot tension set tests before aging indicated corn oil in Example II may have resulted in an undesirably increased tension set, it is noted that Example II after aging 24 hrs @ 191° C. had lower hot tension set than the Control II. The 95° C. Peel Adhesion Test indicates a 13.7 percent (14/102) reduction in adhesion from the substitution of 6 parts of corn oil and a 21.6 percent (22/102) reduction in adhesion from the substitution of 10 parts of corn oil. As seen at the bottom of Table IV when Example III and Control II were mixed in production sized batch the peel adhesion was reduced 53.2 percent (50/94). The break strength and elongation at break both before aging and after aging indicated the corn oil substitution results in a slightly weaker material.

Table V shows a formulation where 10 parts of soybean oil were substituted for 6 parts of castor oil and 4 parts of alkylated napthenic and aromatic hydrocarbon oils. In Table VI the Hot Peel Adhesion test the bladder that included soybean oil had equivalent or higher peel force than the bladder including castor oil. This indicated that soybean oil (commercially available bean oil is very similar in composition to corn oil) does not impart improved release characteristics in bladder where copolymers of isobutylene and para-methylstyrene are the isobutylene rubbery polymers.

TABLE V

Control Exxpro ™ and Castor Oil versus Exxpro ™ and Soybean Oil

|  | Control III (parts by weight) | Example IV (parts by weight) |
|---|---|---|
| 1st Stage | | |
| Exxpro ™ Butyl[1] | 100.00 | 100.00 |
| Carbon Black | 31.00 | 31.00 |
| Castor Oil[2] | 6.00 |  |
| Alkylated Napthenic & Aromatic Hydrocarbon Oils | 4.00 |  |
| Soybean Oil[3] |  | 10.00 |
| Stearic Acid | 0.5 | 0.5 |
| 2nd Stage | | |
| Carbon Black | 24.00 | 24.00 |
| Processing Aid[4] | 5.00 | 5.00 |
| 3rd Stage | | |
| Curatives[5] | 2.85 | 2.85 |
| 4th Stage | | |
| Curatives[5] | 12.00 | 12.00 |
| Total: | 185.35 | 185.35 |

1. Same specifications as Exxpro ™ Butyl in Table I.
2. Same as in Table I.
3. Obtained from the Archer Daniels Midland Company.
4. Microcrystalline waxes.
5. Same as in Table I.

TABLE VI

Physical Properties

|  | Control III | Example IV |
|---|---|---|
| Uncured | | |
| $T_{25}$, min. at 170° C. | 6.00 | 7.1 |
| $T_{90}$, min. at 170° C. | 14.25 | 13.9 |
| Molded Specimen | | |
| 300% Modulus, MPa | 5.39 | 4.41 |
| % Elongation at Break | 665 | 792 |
| Hot Peel Adhesion to Halobutyl Innerliner (Newtons) (No Lubricant) | 92 | 99 |
| Standard Deviation, % | (2.32) | (5.54) |
| Hot Tension Set, % | 20 | 18 |
| Glass Transition Temperature | −64° C. | −68° C. |

Bladder formulations were prepared as listed in Table VII and as tested in Table VIII to illustrate the benefit of corn oil in bladder formulations where copolymers of isobutylene and a conjugated diene are included in principal isobutylene rubbery polymer. In Table VII Example V with 6 phr corn oil and 95 phr butyl rubber had comparable Hot Peel Adhesion to Control IV with castor oil and 95 phr butyl rubber. Example VI with 10 phr corn oil, 75 phr Exxpro™ butyl, and 25 phr butyl rubber had significantly lower (i.e. 70 newtons) Hot Peel Adhesion value. This indicates that even though bladder compositions from regular butyl rubber alone (Example V) do not have improved release characteristics (e.g. low Hot Peel Adhesion Values) that bladders from blends of regular butyl rubber and Exxpro™ butyl have improved release characteristics.

TABLE VII

Control Butyl Rubber with Castor Oil versus Butyl Rubber with Corn Oil and a Blend of Butyl Rubber and Exxpro ™ Butyl with Corn Oil

|  | Control IV | Example V | Example VI |
|---|---|---|---|
| Butyl Rubber[1] | 95.00 | 95.00 | 25.00 |
| Exxpro ™ Butyl[2] |  |  | 75.00 |
| Carbon Black | 55.0 | 55.0 | 55.0 |
| Castor Oil[3] | 6.00 |  |  |
| Corn Oil[4] |  | 6.00 | 10.0 |
| Zinc Oxide | 5.00 | 5.00 | 5.00 |
| Processing Wax | 5.2 | 5.2 | 5.50 |
| Phenolic Resin | 9.00 | 9.00 | 7.00 |
| Neoprene Rubber | 5.00 | 5.00 |  |
| Sulfur |  |  | 0.75 |
| Accelerators and |  |  | 2.40 |
| Scorch Inhibitors |  |  |  |
| Total: | 180.20 | 180.20 | 185.65 |

1. Obtained as Butyl 268 from the Exxon Chemical Company.
2. Same as in Table I.
3. Same as in Table I.
4. Same as in Table I.

TABLE VIII

|  | Control IV Standard Butyl with Castor Oil | Example V Standard Butyl with Corn Oil instead of Castor Oil | Example VI 25/75 Standard Butyl/Exxpro ™ Bromo Butyl + 10 phr Corn Oil |
|---|---|---|---|
| Uncured |  |  |  |
| $T_{25}$, min. at 191° C. | 5 | 4.5 | 3.0 |
| $T_{90}$, min. at 191° C. | 25 | 31.00 | 12.00 |
| Molded Specimen |  |  |  |
| 300% Modulus, MPa | 5.48 | 7.11 | 3.88 |
| % Elongation at Break | 639 | 573 | 736 |
| Break Strength, MPa | 9.56 | 11.1 | 8.71 |
| Hot Peel Adhesion to Halobutyl Innerliner, Newtons No Lubricant | 96 | 99 | 70 |
| (Standard Deviation) | (0.43) | (0.42) | (11.86) |
| Hot Tension Set, % | 19 | 11 | 27 |

The tensile tests on the samples are well known to the art and were used to generate the modulus, break strength, and elongation values.

The Hot Peel Adhesion test measures interfacial adhesion between two different substrates at 95° C. Interface modifiers (also called lubricants) if desired are added to the surface of the bladder substrate before the test is made. These include an emulsifiable silicone oil dispersed in water and thickened with a fumed silica. The bladder material is mixed and with a fabric backing is cured in a mold for 60 minutes at 170° C. A Mylar™ (polyester) sheet having laterally placed windows cut therein (5 mm wide by 100 mm longer) is placed between the cured bladder material having a fabric backing applied thereto and a second substrate which is an uncured tire innerliner material. The innerliner composition comprises at least 70 phr bromobutyl rubber (e.g. 2.1 percent bromine and ML+4 @ 125° C. of 40±4), up to 30 phr of other rubbers, about 50 to 60 phr of a GPF carbon black such as N660, about 18 phr of processing aids such as alkylated napthenic and aromatic hydrocarbons and napthenic and aromatic process oils, about 2 phr of zinc oxide, about 1.5 phr of accelerators such as 4-morpholinyl-2-benzothiazyldisulfide and about 0.5 Phr of sulfur. The window in the Mylar™ sheet creates a known area of interfacial adhesion between the bladder sample and the other substrate (such as the tire innerliner sample). A fabric backing is applied to the tire innerliner material. The assembled sample of the two substrates (bladder and tire innerliner) with their fabric backing and Mylar™ sheet undergo a curing cycle where the second substrate is cured in a diaphragm curing mold for 28 minutes at 150° C. with 100 psi pressure (0.69 MPa). The fabric backing is adhered to the tire innerliner during curing. After this process the assembled sample is cut in 1 inch (2.54 cm) wide strips with the window portion of the Mylar™ longitudinal and centered therein, the two substrate materials are separated slightly by hand operation. They are then mounted in an Instron™ type force displacement tester in a configuration such that the peel angle between the separated substrates is 180°. The force displacement tester separates the substrates at a rate of 51 mm/min and records the force used. The average force used over the adhered area divided by the sample width is recorded as the adhesion value.

The curing bladders described herein are useful in bladder or diaphragm type curing presses to cure hydrocarbon rubber compositions and preferably pneumatic tires. These presses desirably have one or more molding surfaces besides the diaphragm or bladder. The uncured hydrocarbon composition is placed in the mold, the mold is closed, and the bladder or diaphragm is inflated (expanded usually with a heated gas such as steam). This sandwiches the uncured composition (desirably a green tire) between the bladder or diaphragm and the one or more other mold surfaces. The hydrocarbon rubber typically flows and conforms to the one or more other mold surfaces which are often a metal or alloy thereof and rather rigidly fixed during the molding operation. Further heating of the uncured composition causes it cure (also called vulcanization or cross-linking) which solidifies the final shape of the article conforming to the one or more rigid mold surfaces. The bladder or diaphragm is then deflated (removing the internal pressure) to facilitate removal of the molded parts. Depending on the shape of the article, one or more of the other molding surfaces may physically move to open the mold thereby further facilitating part removal.

What is claimed is:

1. In a curing press for a rubber composition of the type which uses an expandable bladder to assist in shaping and curing said rubber composition wherein the bladder is a molded crosslinked formulation including one or more rubbery polymers, wherein at least 50 weight percent of said rubbery polymers of said bladder are at least one isobutylene rubbery polymer having at least 80 weight percent repeat units from isobutylene;

one or more curatives for said one or more rubbery polymers;

the improvement wherein the bladder further comprises from about 1 to about 20 parts by weight of corn oil dispersed throughout said bladder formulation and wherein said corn oil reduces the Hot Peel Adhesion value of the crosslinked bladder formulation at least 10 percent as compared to the same bladder formulation without said corn oil;

at least 10 weight percent of said at least one isobutylene rubbery polymer is one or more copolymers of isobutylene and a para-alkylstyrene; and wherein said parts by weight are based on 100 parts by weight of the rubbery polymers in said bladder formulation.

2. In a curing press according to claim 1, wherein said one or more copolymers of isobutylene and paraalkylstyrene is a halogenated copolymer comprised of from about 80 to about 99 weight percent isobutylene and from about 1 to about 20 weight percent paraalkylstyrene, and said at least one isobutylene rubbery polymer is at least 75 weight percent of said one or more rubbery polymers of said bladder.

3. In a curing press according to claim 2, wherein said corn oil is present from about 2 to about 18 parts by weight, and wherein said one or more copolymers of isobutylene and para-alkylstyrene are at least 20 weight percent of said rubbery polymers of said bladder.

4. In a curing press according to claim 3, wherein said one or more copolymers of isobutylene and para-alkylstyrene are one or more brominated copolymers.

5. In a curing press according to claim 3, wherein said one or more copolymers of isobutylene and para-alkylstyrene are at least 50 weight percent of said at least one rubbery polymer of said bladder.

6. In a curing press according to claim 2, wherein said press is designed to shape and cure rubber compositions into pneumatic tires; wherein said corn oil is oil from Zea mays and wherein said bladder rubber composition is free of castor oil.

7. In a curing press according to claim 4, wherein said curing press is designed to shape and cure rubber compositions into pneumatic tires.

8. An expandable curing bladder being the molded crosslinkstar from a formulation comprising:

one or more rubbery polymers, wherein at least 50 weight percent of said rubbery polymers are at least one isobutylene rubbery polymer having at least 80 weight percent units from isobutylene;

wherein at least 10 weight percent of said at least one isobutylene rubber polymer is one or more copolymers of isobutylene and para-alkylstyrene;

from about 1 to about 20 phr of corn oil dispersed throughout said bladder and wherein said corn oil reduces the Hot Peel Adhesian value of said crosslinked bladder formulation at least 10 percent as compared to the same bladder formulation without said corn oil; and one or more curatives for said rubbery polymers;

wherein phr is parts by weight based upon 100 parts by weight of said one or more rubbery polymers in said bladder.

9. An expandable curing bladder according to claim 8, wherein said one or more copolymers of isobutylene and para-alkylstyrene are halogenated copolymers comprised of from about 80 to about 99 weight percent isobutylene and from about 1 to about 20 weight percent para-alkylstyrene and wherein at least 75 weight percent of said rubbery polymers are said at least one isobutylene rubbery polymer.

10. An expandable curing bladder according to claim 9, wherein said corn oil is present from about 2 to about 18 parts by weight, and wherein said one or more copolymers of isobutylene and para-alkylstyrene are at least 20 weight percent of said at least one isobutylene rubbery polymers.

11. An expandable curing bladder according to claim 10, wherein said one or more copolymers of isobutylene and para-alkylstyrene are at least 50 weight percent of said at least one isobutylene rubber polymers.

12. An expandable curing bladder according to claim 10, wherein said para-alkylstyrene is paramethylstyrene or para-halomethylstyrene or combinations thereof.

13. An expandable curing bladder according to claim 12, wherein the cured bladder composition has an elongation to break before aging of from about 400 to about 1000 percent and a 300 percent modulus value of from about 4.0 to about 8.0 MPa.

14. An expandable curing bladder according to claim 13, wherein said curing bladder has a Hot Peel Adhesion value from about 45 to about 90 Newtons; wherein said corn oil is oil from Zea mays and wherein said bladder composition is free of castor oil.

15. A method of using an expandable rubber bladder to cure an uncured rubber composition, said method comprising the sequential steps of:

first inserting an uncured rubber composition into a curing press having an expandable rubber bladder positioned therein and having one or more molding surfaces;

second expanding said expandable rubber bladder by filling the internal portion of said bladder with a fluid to expand the bladder outwardly against an inner surface of the uncured rubber composition to force said uncured rubber composition against said one or more molding surfaces and curing the rubber composition into a cured article under conditions of heat and pressure; and third deflating said expandable rubber bladder and removing the cured article from said curing press, the improvement wherein the expandable bladder is a molded and crosslinked rubber formulation wherein said rubber formulation comprises:

one or more rubbery polymers, at least 50 weight percent of said rubbery polymers being at least one rubbery isobutylene polymer having at least 80 weight percent repeat units from isobutylene, and wherein at least 10 weight percent of said at least one isobutylene rubbery polymer is one or more copolymers of isobutylene and para-alkylstyrene; and from about 1.0 to about 20 parts by weight of corn oil dispersed throughout said bladder and wherein said corn oil reduces the Hot Peel Adhesion value of said crosslinked bladder formulation at least 10 percent as compared to the same bladder formulation without said corn oil;

wherein said parts by weight are based upon 100 parts by weight of said one or more rubbery polymers in said bladder.

16. A method according to claim 15, wherein at least 10 weight percent of said at least one isobutylene rubber polymer is one or more halogenated copolymers of isobutylene and para-alkylstyrene comprising from 80 to 99 weight percent isobutylene and from 1 to 20 weight percent para-alkylstyrene, and wherein said corn oil is present from about 2.0 to about 18 parts by weight.

17. A method according to claim 16, wherein said one or more copolymers of isobutylene and paraalkylstyrene are at least 20 weight percent of said at least one isobutylene polymer.

18. A method according to claim 17, wherein said one or more copolymers of isobutylene and paraalkylstyrene are brominated copolymers.

19. A method according to claim 16, wherein said para-alkylstyrene in para-methylstyrene or parahalomethylstyrene or combinations thereof.

20. A method according to claim 16, wherein said rubber composition being cured is a pneumatic tire.

* * * * *